May 25, 1943. T. BACKUS 2,319,784
DRIVING MECHANISM
Filed Sept. 13, 1940 4 Sheets-Sheet 1

INVENTOR.
THOMAS BACKUS
BY Earl & Chappell
ATTORNEYS.

May 25, 1943.  T. BACKUS  2,319,784

DRIVING MECHANISM

Filed Sept. 13, 1940  4 Sheets-Sheet 3

INVENTOR.
THOMAS BACKUS
BY Earl + Chappell
ATTORNEYS.

Patented May 25, 1943

2,319,784

UNITED STATES PATENT OFFICE 2,319,784

DRIVING MECHANISM

Thomas Backus, Kalamazoo, Mich., assignor to Fuller Manufacturing Company, Kalamazoo, Mich.

Application September 13, 1940, Serial No. 356,573

22 Claims. (Cl. 74—189.5)

This invention relates to improvements in driving mechanism.

This invention relates to drives for vehicles such as trucks and the like in which an engine drives the drive shaft by means of a clutch and a change speed transmission.

In such drives, considerable difficulty may be encountered in shifting from one gear ratio to another because of the varying speeds of the various parts of the drive and the inertia of both the vehicle and the gear into which it is desired to shift and the countershaft and its associated parts which may tend to maintain the differences in speed, or, in some cases, even to accentuate them.

In a vehicle operating on a smooth surface such as a concrete highway, considerable difficulty may be encountered in shifting down from a high ratio to a low ratio because the speed of the drive shaft, which will be maintained by the inertia of the vehicle, is considerably greater than the speed of that gear on the main shaft into which the driver is attempting to shift. The lower speed of the gear into which the driver is attempting to shift is maintained by the inertia of the gear and the countershaft to which it is geared and the associated parts, and in order to shift down properly, it is necessary to speed up this gear in order to synchronize its speed with the speed of the drive shaft. It has been common practice in the past when making such a shift to double clutch, which consists in disengaging the clutch and throwing the transmission out of gear, then engaging the clutch and accelerating the engine, to bring the speed of the gear into which the shift is to be made up to the speed of the drive shaft, after which the clutch is disengaged and the gears are shifted.

In dirt moving equipment, a slightly different but related problem is encountered. The difficulties encountered are primarily encountered in shifting from a low gear ratio to a high gear ratio. The equipment is ordinarily operating off the highway and in relatively soft ground, so that when the clutch is disengaged, the speed of the vehicle and consequently the speed of the drive shaft drop rather quickly. The speed of the gear into which the shift is to be made is greater than the speed of the drive shaft at the time the clutch is disengaged and the inertia of the countershaft to which the gear is geared and the associated parts is such that the speed of the gear into which the shift is to be made is maintained higher than the speed of the drive shaft for a considerable time. The driver, in order to make the shift, must either synchronize the speeds by waiting until both vehicle and countershaft slow down to the point where kinetic energy is negligible in order to avoid clashing of the gears, or must shift so quickly that the gears engage before the vehicle has a chance to slow down. The former is undesirable because too much vehicle momentum is lost and the latter is undesirable because it may injure the gears. Double clutching in such a case is, of course, not effective.

In my invention, I place a jaw clutch between the transmission and the drive shaft and place a hydraulic coupling, in which an impeller or driving member transfers torque to a runner or driven member through the creation of a vortex in a hydraulic medium, between the engine and the transmission. By thus placing the clutch, I practically eliminate the difficulties which result from the inertia of the parts in the transmission and the tendency of this inertia to maintain the gears at a speed too high or too low to permit easy shifting. The hydraulic coupling provides the necessary break in the line to permit engagement of the jaw clutch and permits the engine to operate at torque peak without stalling even when the vehicle is standing still. It eliminates shock load and vibration. The jaw clutch employed between the transmission and the drive shaft may be much smaller than a similarly located friction clutch, thus giving a minimum of inertia.

The difficulties of disengaging the jaw clutch during operation of the vehicle are solved by providing a friction clutch which is capable of driving the engine against compression during coasting and which is so arranged that it prevents the jaw clutch from driving the engine during coasting and permits the jaw clutch to be disengaged easily because it is relieved of driving load.

By placing the clutch between the transmission and the drive shaft, I eliminate a great deal of the above mentioned difficulties encountered because of the inertia of the countershaft and its associated parts. When the connection between the engine and the transmission is broken by a conventionally located clutch, the countershaft is freed. Due to the fact that its speed is always in constant relation to engine speed and when the transmission is in gear is generally higher than the speed of the main shaft, its inertia is greater than that of the main shaft. By locating the clutch back of the transmission, I free the main shaft rather than the countershaft from the engine and the smaller inertia of the main shaft is the only factor to be considered.

The objects of this invention are:

First, to provide a new and improved drive of the type above referred to.

Second, to provide such a drive in which the difficulties caused by the inertia of the countershaft in the transmission and its associated parts are eliminated to a great extent.

Third, to provide such a drive in which it is possible to locate the clutch between the transmission and the drive shaft.

Fourth, to provide such a drive in which a hydraulic coupling may be employed to full advantage to make use of the full torque of the engine and to eliminate shock loading and vibration.

Fifth, to provide such a drive which may be easily disengaged during coasting.

Further objects and advantages pertaining to details and economies of construction and operation will appear from the description to follow. The invention is defined in the claims. A preferred embodiment of my invention is illustrated in the accompanying drawings, in which:

Figures 1, 3, 4, 5, 6:
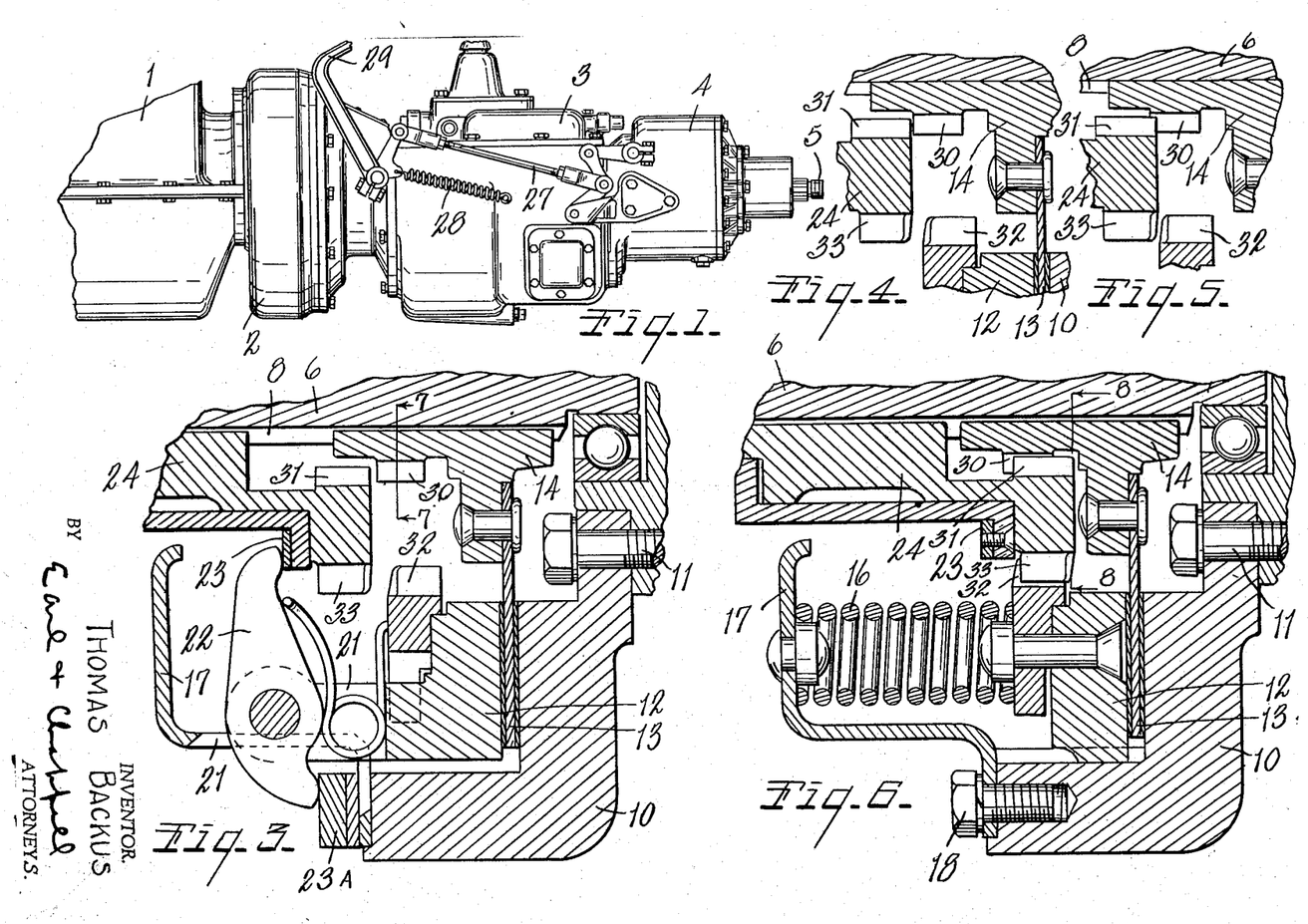
Fig. 1 is a side elevational view of my improved mechanism.
Fig. 3 is a partial sectional view of a portion of the structure shown in Fig. 2, showing only the small friction clutch which is associated with the jaw clutch, engaged.
Fig. 4 is a detail view partially in section and corresponding to a portion of Fig. 3, showing the synchronizing teeth for the jaw clutch about to engage and showing the relative spacing of the synchronizing teeth and jaw clutch teeth.
Fig. 5 is a view similar to Fig. 4, showing the synchronizing teeth for the jaw clutch engaged and the jaw clutch teeth not engaged.
Fig. 6 is a view similar to Fig. 3 showing the jaw clutch and its associated parts all in engaged position.

My new and improved drive consists of an engine 1 which may be an internal combustion engine such as is commonly used to propel vehicles such as trucks or the like. Directly connected to the engine is a hydraulic coupling 2 of the conventional type in which an impeller or driving member transfers torque to a runner or driven member through a hydraulic medium by creating a vortex therein. The details of this hydraulic coupling form no part of this invention and are therefore not shown.

Directly connected to the hydraulic coupling is a change speed transmission 3 which may be conventional in form and which is not shown in detail because its details form no part of the present invention. The transmission is provided with a plurality of forward speeds and one or more reverse speeds.

Directly behind the transmission 3 is a clutch shown generally at 4 which is primarily a jaw or gear clutch. It is connected directly to the drive shaft of the vehicle at the point 5.

Figure 2:
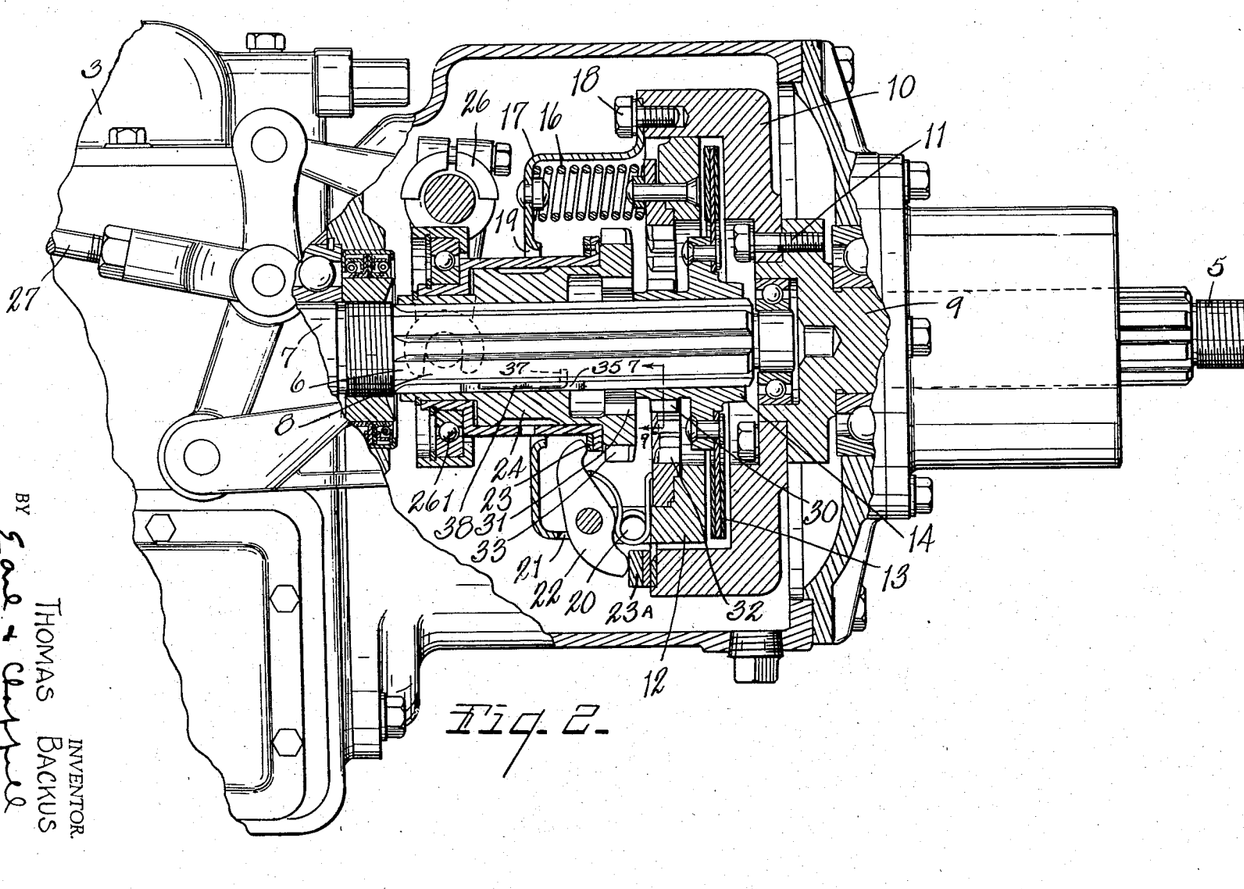
Fig. 2 is a view partly in section showing the jaw clutch and its associated mechanism, all disengaged.

The second clutch 4 comprises a main shaft 6 which is directly connected to the main shaft 7 of the transmission and is provided with splines 8. In line with the shaft 6 is a shaft 9 which is directly connected with the drive shaft of the truck at 5.

A flanged fly-wheel 10 is fixed to the shaft 9 by means of bolts 11. Within the flanged portion of the fly-wheel is a clutch pressure plate 12 shiftable toward the fly-wheel to clamp the clutch plate 13 of the clutch hub 14 which is splined to shaft 6 by means of a loosely fitted female splined portion having the female splines 15 embracing the splines 8 of the shaft 6.

The pressure plate 12 is urged toward the fly-wheel 10 by means of compression springs 16 which bear upon the clutch pressure plate 12 and upon the cover 17 which is fastened to the fly-wheel with bolts 18 and which is apertured at 19 to receive the shaft 6.

The clutch pressure plate 12 is connected to the fly-wheel 10 so as to rotate therewith by means of ears 20 which engage in slots 21 of the cover 17.

For disengaging this clutch, I provide levers 22 pivoted on the ears 20 and extending through the slots 21 and having their ends engage the shims 23A on the fly-wheel and the hardened plate 23 mounted on a shifter 24 which is splined on the shaft 6 by means of a loosely fitted female splined portion having the female splines 25 of the same width as the female splines 15.

The shifter 24 is shifted by means of a shifting yoke 26 controlled by the clutch rod 27 and the clutch retracting spring 28 which tends to urge the clutch to engagement by moving the shifter to the right as viewed in Fig. 2. The usual clutch pedal 29 is employed for disengagement of the clutch.

The yoke 26 is connected to the shifter 24 with a suitable ball bearing 26I.

The clutch hub 14 carries synchronizing teeth 30 adapted to engage synchronizing teeth 31 on the shifter 24.

The jaw clutch itself consists of clutch teeth 32 on the clutch pressure plate 12 which fit loosely, for a reason to be later more fully explained, with corresponding clutch teeth 33 on the shifter 24.

Figures 11, 12, 13, 14, 15:
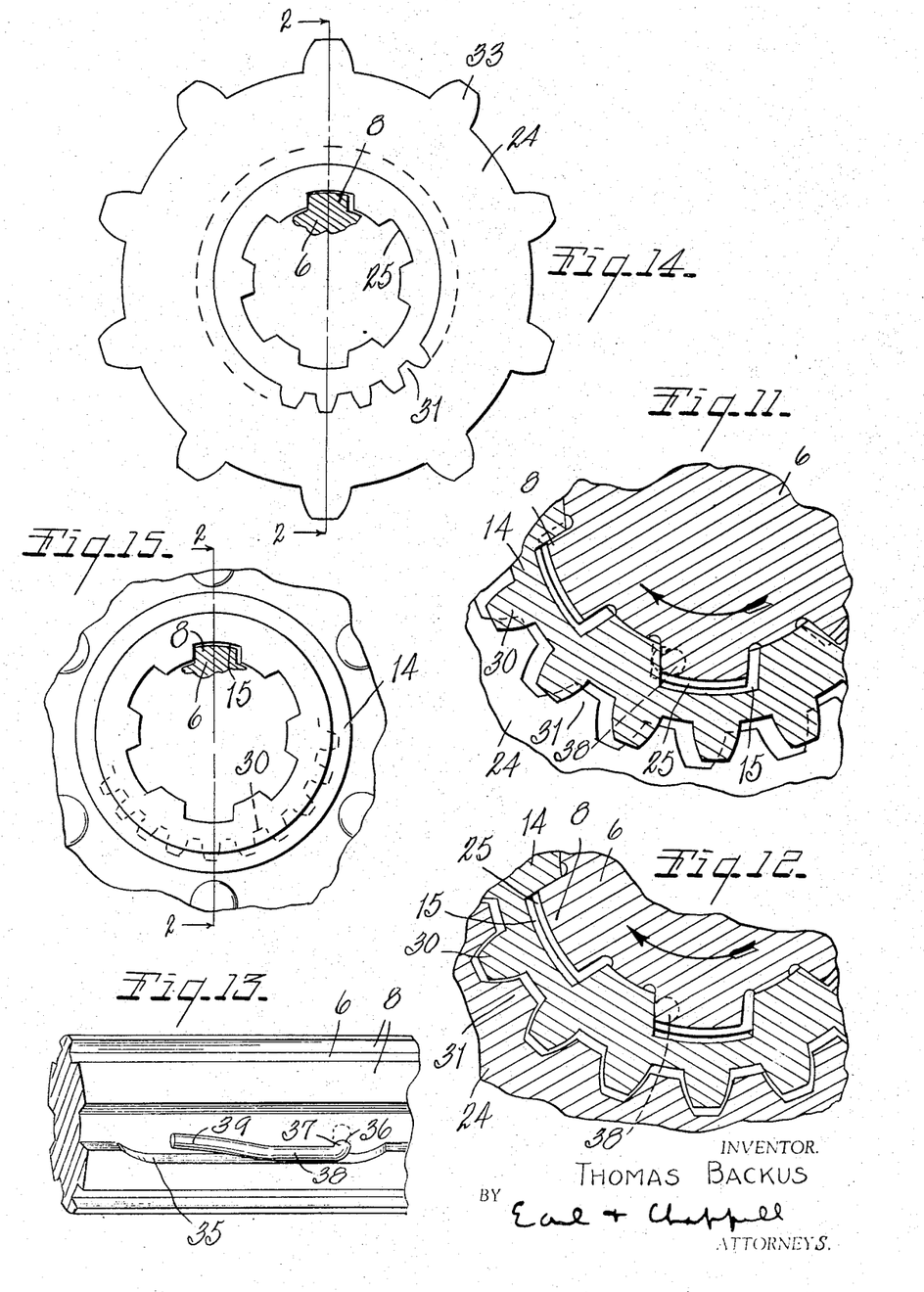
Fig. 11 is a view corresponding to Fig. 7, showing the situation presented when the transmission is in reverse and the friction clutch is engaged, but the synchronizing teeth are not engaged, with the motor idling.
Fig. 12 is a view corresponding to Fig. 11, showing the relationship of the parts when the synchronization has occurred with the transmission in reverse.
Fig. 13 is a view of the splined shaft, showing the manner of mounting the spring therein for lining up the parts to permit engagement of the jaw clutch for starting in forward speeds.
Fig. 14 is a view of the clutch gear showing the disposition of the backlash in the female spline thereof in relation to the shaft spline.
Fig. 15 is a view of the central portion of the clutch hub showing the disposition of the backlash in the female spline thereof in relation to the shaft spline.

The side of one of the splines 8 of the main shaft 6 is cut away as shown at 35 in Fig. 13, and a hole 36 is bored in the shaft to receive the bent end 37 of the spring 38 which lies in the cut-out portion 35 of the spline 8 and has its free end 39 extending outwardly into the space between the splines to tend to resiliently urge the shifter 24 up against the faces of the spline which are the driving faces when the drive is in a forward speed.

The teeth 30 and 31 on the clutch hub 14 and the shifter 24 respectively serve as synchronizing teeth for the jaw clutch teeth 32, 33. These teeth fit loosely with the usual backlash found between such synchronizing teeth to permit them to slide into engagement when they line up. Since the clutch hub 14 and the shifter 24 are both splined to the shaft 6, there is no relative rotation between the teeth 30 and 31. There is only the slight annular displacement resulting from the loose fitting of the splines with which the clutch 14 and the shifter 24 are splined to the shaft 6. The teeth 30 and 31 have merely this customary backlash because they serve as blocking teeth to keep the teeth 32 and 33 of the jaw clutch from engaging prior to synchronization. A much greater relative looseness of fit between teeth 32 and 33 is provided because relative rotation takes place between these teeth until they are synchronized. Since they are engaged by a relative movement along the shaft 6, it has been found desirable to provide a relatively loose interfit so that the possibility of the ends of the teeth 32 and 33 abutting is reduced to a minimum.

The friction clutch which consists of the flywheel 10, pressure plate 12 and the clutch plate 13 which is mounted on the hub 14, does not have sufficient capacity to serve as a direct driving member for moving a loaded truck and it will slip under such a load. It does have sufficient capacity, however, to drive the engine when the driver lifts his foot from the accelerator and lets the vehicle coast with the drive shaft driving the engine.

The various parts of my invention are so arranged that the jaw clutch is operative only to carry driving torque and it does not carry any coast load. The friction clutch takes the coast load and thereby relieves the jaw clutch of load, so that the jaw clutch may be disengaged during coasting prior to disengagement of the friction clutch which results in a complete disengagement of the clutch to permit the shifting of gears. The arrangement of the parts can be best explained by explaining the operation of my invention.

Figures 7, 8, 9, 10:
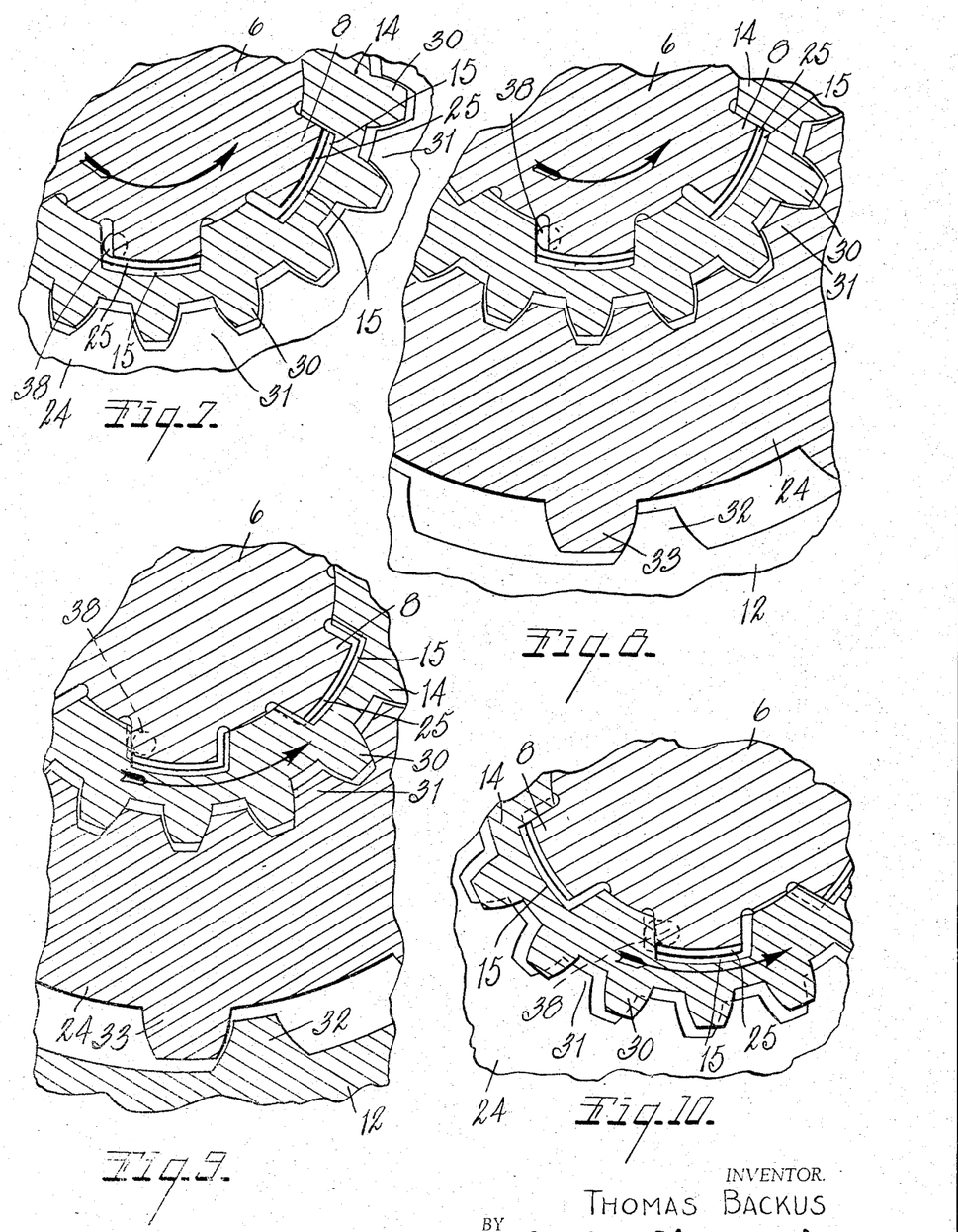
Fig. 7 is a detail sectional view taken on the line 7—7 of Fig. 3, showing the position of the parts when the vehicle is standing still and the propeller shaft is dead.
Fig. 8 is a detail sectional view taken on the line 8—8 of Fig. 6, showing the relationship of the parts after the clutch pedal has been released and the engine has been accelerated to put a vehicle in motion.
Fig. 9 is a detail sectional view corresponding to Fig. 8 and showing the relationship of the parts when the vehicle is in motion and when the engine is not driving it and it is coasting.
Fig. 10 is a detail sectional view corresponding to Fig. 7, showing the relationship of the parts after the shifting of gears and the release of the clutch pedal but before the engine speed has come up to the propeller shaft speed, a condition which occurs if a shift is made while the vehicle is in motion.

In Fig. 7, I show the arrangement of the parts when the vehicle is standing still with the engine idling. The drive shaft is at rest and the jaw clutch 32, 33 is disengaged as is the friction clutch 10, 13. The shaft 6 is idling in a counterclockwise direction and is driving both the clutch hub 14 and the shifter 24 so that the parts are in the relative positions shown in Fig. 7. The frictional drag of the disengaged friction clutch which occurs in all such clutches even though disengaged, holds the clutch hub 14 back against the driving face of the splines 8, even though the friction clutch is not completely engaged, and the spring 38 holds the shifter 24 likewise against the driving face of the splines 8.

I have found that if the spring 38 is not provided to hold the shifter 24 against the driving faces of the splines 8, there may be a tendency of the shifter 24 to overrun, making engagement of the clutch impossible.

In the position shown in Fig. 7, the synchronizing teeth 30 on the clutch hub 14 are aligned with the synchronizing teeth 31 on the shifter 24 so that the teeth 31 can move past the teeth 30 to permit the jaw clutch teeth 33 to come into position to engage the jaw clutch teeth 32 as the shifter is moved to the right as viewed in Fig. 3 by the clutch reacting spring 28.

As the clutch pedal is released, the clutch pressure plate 12 moves into engagement with the clutch plate 13, clamping it against the fly-wheel 10 before the jaw clutch can engage. The parts are so arranged that upon release of the clutch pedal the friction clutch engages first and the jaw clutch engages later and on depressing the clutch pedal so that the jaw clutch disengages first and completely before the friction clutch disengages so that on release of the clutch pedal the friction clutch can serve as a synchronizer for the jaw clutch and so that on depression of the clutch pedal the coast load can be taken by the friction clutch only relieving the jaw clutch of load so that the teeth can be disengaged. The engine is idling throughout this operation. After the friction clutch has engaged, the engagement of the jaw clutch teeth 32 and 33 takes place, as above described. In all probability, because of the wide spacing between jaw clutch teeth 33 and jaw clutch teeth 32, the jaw clutch will go into engagement immediately. It may be, however, that the jaw clutch teeth 33 will come to rest against the left hand face of the teeth 32 as viewed in Fig. 3.

Throughout this operation, the engine is idling and after the clutch pedal is released, the engine is accelerated and the torque of the engine is transmitted through the hydraulic coupling 2 and the transmission 3 to the clutch 4. If the teeth 32 and 33 have been engaged as would be the usual situation, the torque is taken by the jaw clutch and transmitted to the drive shaft of the vehicle. If the teeth 33 are resting against the left hand face of the teeth 32, as above described, and the vehicle is loaded, the friction clutch will slip sufficiently to permit the jaw clutch teeth 32 and 33 to engage without any danger of raking or clash. In either event, the friction clutch cushions the engagement of the jaw clutch teeth 32 and 33 so that there is no clash or shock.

In Fig. 8, I show the relative position of the parts when the truck is in motion with the engine driving the truck. The parts are all in the relative positions shown in Fig. 6 and the shaft 6 is driving the shifter 24 which in turn through clutch teeth 32 and 33 is driving the fly-wheel so that the torque of the engine is transmitted to the drive shaft through both the friction clutch and the jaw clutch. The friction clutch is transmitting torque to the full extent of its capacity, but any torque over and above the capacity of the friction clutch is transmitted through the jaw clutch, thus preventing any slippage of the friction clutch. By this arrangement it is possible to make use of a small friction clutch which does not have sufficient capacity to handle the fully loaded vehicle and thus eliminate inertia which would result if the friction clutch were made large enough to have sufficient capacity to handle the entire load of the vehicle.

When it is desired to shift gears, the clutch pedal 29 is depressed. The first part of the movement of the clutch pedal will disengage the jaw clutch without disengaging the friction clutch and until the jaw clutch is completely disengaged, the friction clutch remains engaged. The final movement of the clutch pedal disengages the friction clutch.

The reason for this sequence of operations is to permit disengagement of the jaw clutch. Even coast load on the jaw clutch with the vehicle driving the transmission and engine through the jaw clutch would load the jaw clutch so that disengagement, if not impossible, would be very difficult. So long as the friction clutch is engaged, the jaw clutch does not transmit coast load because of the loose interfitting of the teeth 32 and 33. Since the jaw clutch teeth 32 and 33 are not loaded during coasting, it is possible to disengage them easily by depressing the clutch pedal. The friction clutch must remain in engagement and carry the coast load until the jaw clutch teeth are completely disengaged, otherwise they would become loaded, making it impossible or difficult to disengage them.

When one wishes to shift gears, one first removes his foot from the accelerator and at that time the drive shaft of the vehicle drives the clutch, the transmission, the hydraulic coupling and the engine. When this condition occurs, the fly-wheel 10 through the friction clutch drives the clutch hub which in turn drives the shaft 6 as is shown in Fig. 9. The female splines 15 of the clutch hub 14 engage the coast or back sides of the splines 8 on the shaft 6 as shown in Fig. 9. Since the friction clutch is of sufficient capacity to take the coast load and to drive the engine, there is no slippage of the friction clutch. The clutch teeth 32 on the fly-wheel and the clutch teeth 33 on the shifter are spaced so far apart or are provided with so much backlash that their coast sides cannot come into engagement as long as the friction clutch is engaged and does not slip. The synchronizing teeth 30 on the clutch hub through engagement with the coast side of the synchronizing teeth 31 on the shifter will cause the shifter to assume the position shown in Fig. 9. By this disposition of the parts, all load is taken off the clutch teeth 32 and 33 which makes it possible to disengage the jaw clutch by moving the shifter to the left as viewed in Fig. 6. There is no material load on the synchronizing teeth 30 and 31 to interfere with this shifting since there is no drive through the shifter.

After the clutch teeth 32 and 33 have been disengaged, the further depression of the clutch pedal 29 completely disengages the synchronizing teeth and thereafter the friction clutch by moving the parts to the position shown in Fig. 2. Thereafter the desired gear is selected and the clutch pedal is released.

In Fig. 10, I show the condition which exists at this time. The propeller shaft is turning faster than the output shaft of the transmission. The friction clutch is engaged but the synchronizing teeth and jaw clutch teeth have not engaged. In view of the fact that the drive shaft of the vehicle is turning faster than the output shaft of the transmission, it is driving the friction clutch hub 14 so as to bring the female splines 15 against the coast or the back sides of the splines 8. The shifter 24 is being driven by the shaft 6 and the female splines 25 of the shifter are engaging the driving faces of the splines 8. When the parts are in this position, the synchronizing teeth 30 on the clutch hub are not aligned with the synchronizing teeth 31 of the shifter and form a block so that the shifter can not move to the right as viewed in Fig. 4. Because of this arrangement of the parts, the friction clutch serves as a synchronizer. When the engine is accelerated, the shaft 6 will eventually reach the speed of the drive shaft and as acceleration continues, the driving faces of the splines 8 will move up to the driving faces of the female splines 15 which will cause the synchronizing teeth 30 and 31 to align, permitting the spring 38 to move the shifter to the position shown in Fig. 5.

In most cases, because of the wide spacing of the clutch teeth 32 and of the clutch teeth 33, the clutch teeth will slide into engagement. In some cases the clutch teeth 33 will engage the left hand faces of the clutch teeth 32 as viewed in Fig. 5, which will interfere with complete engagement between clutch teeth 32 and 33. If this condition occurs and the load of the truck is such that the friction clutch does not have sufficient capacity to handle the torque, the friction clutch will slip, permitting the clutch teeth 32 and 33 to engage without any clashing. The friction clutch will serve as a cushion during engagement of the clutch teeth 32 and 33.

After the clutch teeth are engaged in the position shown in Fig. 6, the drive continues as above described with the parts disposed relative to one another as shown in Fig. 8.

In Figs. 11 and 12, I show the relationship of the parts when the transmission is in reverse and the clutch moves to engagement. In Fig. 11, I show the shaft 6 rotating in a clockwise direction. The splines 8 engaged in the female splines 15 of the clutch hub are driving the clutch hub in a clockwise direction. The shifter 24 is also being driven in a clockwise direction, but the spring 38 holds the shifter away from the coast side, which in this case is the driving face of the splines 8.

When the clutch pedal is released, the friction clutch engages first. Thereafter the spring 28 carries the shifter to the right as viewed in Figs. 3 and 4. Since the synchronizing teeth 30 and 31 are not aligned, they form a block and at the instant of contact between teeth 30 and 31, the jaw clutch teeth cannot engage. Immediately upon contact, however, a frictional drag is set up which compresses the spring 38, causing the synchronizing teeth 30 and 31 to come into alignment permitting the jaw clutch teeth to become engaged. In this operation, as well as in forward speeds, the friction clutch cushions the engagement of the clutch teeth.

In Figs. 14 and 15, I show the disposition of the backlash in the female splines 15 and 25. It will be noted that this backlash is at the coast or rear side in both instances. I provide this backlash in the same relative position on both the clutch hub and shifter so that there can be relative rotational movement between the clutch hub and the shifter to permit the synchronizer to work properly and to permit one to engage the jaw clutch for reversing.

By arranging the friction clutch and the jaw clutch as I do, I make it possible to disengage the jaw clutch during coasting since the jaw clutch is relieved of all coast load by the friction clutch during coasting because the jaw clutch teeth are spaced far enough apart both on the shifter and on the clutch plate to provide more backlash than is provided in the splined connection between the clutch hub and the splined shaft. So long as the friction clutch carries the coast load, the jaw clutch teeth cannot come into engagement.

It is only necessary to make the friction clutch of sufficient capacity to carry coast load and I prefer to thus limit its capacity because by reducing the size of the friction clutch I eliminate inertia which would interfere with the easy shifting of gears in the transmission.

The hydraulic coupling in my combination serves as a break in the connection between the engine and the transmission, making it possible to engage the clutch without stalling the engine. When the hydraulic coupling is employed in the combination, the engine may be operated at torque peak and shock loading and vibration are eliminated. I prefer to use the hydraulic coupling because it greatly simplifies the construction and operation of the drive, particularly when starting the vehicle from a stand. Some other disengageable connection between the engine and the transmission could be employed, however, and the elimination of objectionable inertia by using my clutch construction would materially assist in the shifting of gears.

I have referred to the change speed transmission as a transmission, but it will be understood that when I refer to the transmission I refer to a change speed transmission.

I prefer to use a jaw or tooth clutch in my invention, but it would be possible to obtain desirable results with any other type of positive engagement clutch as distinguished from a friction clutch of the plate or cone type the speed of engagement of which can be controlled by the operator to permit slipping.

I have shown the construction in which the clutch may be employed either for forward or reverse speeds, but it will be apparent to those skilled in the art that if a separate reversing gear were supplied it would not be necessary to provide the backlash in the connection between the shifter and the splined shaft and that the spring 38 and its function could be eliminated.

The terms and expressions which have been herein employed are used as terms of description and not of limitation, and there is no intention in the use of such terms and expressions of excluding any equivalents of the features shown and described. It is recognized that various modifications are possible within the scope of the invention claimed.

Having thus described my invention, what I claim as new and desire to secure by Letters Patent is:

1. The combination in the order named, of an engine, a hydraulic coupling, a transmission, and a clutch comprising a splined shaft having splines thereon and having a shifter splined thereto for longitudinal movement and having rotational play thereon, a friction clutch hub splined thereon and having rotational play thereon, jaw clutch teeth on said shifter, and a friction clutch plate on said friction clutch hub, a clutch member having thereon friction clutch parts adapted to cooperate with said friction clutch plate to form a friction clutch therewith to transmit torque and coast load, said friction clutch plate and said clutch parts being of a size to carry the coast load but insufficient to carry driving torque load in excess of the coast load, jaw clutch teeth adapted to engage said jaw clutch teeth on said shifter to form therewith a jaw clutch adapted to transmit torque from said driving means to said clutch member, and synchronizing teeth on said clutch hub and on said shifter adapted to block said jaw clutch teeth until they are brought into synchronization after engagement of said friction clutch, said clutch hub and said shifter being mounted on said splined shaft to transmit torque together from said splined shaft to said clutch member and said jaw clutch teeth on said shifter and on said clutch member being so spaced that when said friction clutch is transmitting coast load to said splined shaft the coast load sides of said teeth are out of driving engagement, means for shifting said shifter and said friction clutch parts to first engage said friction clutch parts and thereafter engage said jaw clutch only after synchronization or to disengage said jaw clutch and thereafter disengage said friction clutch, and spring means adapted to yieldingly hold said shifter in engagement with driving portions of the splines of said splined shaft.

2. The combination of a prime mover, a driven member, and a clutch interposed therebetween comprising a splined shaft having splines thereon and having a shifter splined thereto for longitudinal movement and having rotational play thereon, a friction clutch hub splined thereon and having rotational play thereon, jaw clutch teeth on said shifter, and a friction clutch plate on said friction clutch hub, a clutch member having thereon friction clutch parts adapted to cooperate with said friction clutch plate to form a friction clutch therewith to transmit torque and coast load, said friction clutch plate and said clutch parts being of a size to carry the coast load but insufficient to carry driving torque load in excess of the coast load, jaw clutch teeth adapted to engage said jaw clutch teeth on said shifter to form therewith a jaw clutch adapted to transmit torque from said driving means to said clutch member, and synchronizing teeth on said clutch hub and on said shifter adapted to block said jaw clutch teeth until they are brought into synchronization after engagement of said friction clutch, said clutch hub and said shifter being mounted on said splined shaft to transmit torque together from said splined shaft to said clutch member and said jaw clutch teeth on said shifter and on said clutch member being so spaced that when said friction clutch is transmitting coast load to said splined shaft the coast load sides of said teeth are out of driving engagement, means for shifting said shifter and said friction clutch parts to first engage said friction clutch parts and thereafter engage said jaw clutch only after synchronization or to disengage said jaw clutch and thereafter disengage said friction clutch, and spring means adapted to yieldingly hold said shifter in engagement with driving portions of the splines of said splined shaft.

3. The combination in the order named, of an engine, a hydraulic coupling, a transmission and a clutch comprising a splined shaft having splines thereon and having a shifter splined thereto for longitudinal movement and having rotational play thereon, a friction clutch hub splined thereon and having rotational play thereon, jaw clutch teeth on said shifter, and a friction clutch plate on said friction clutch hub, a clutch member having thereon friction clutch parts adapted to cooperate with said friction clutch plate to form a friction clutch therewith to transmit torque and coast load, said friction clutch plate and said clutch parts being of a size to carry the coast load but insufficient to carry driving torque load in excess of the coast load, jaw clutch teeth adapted to engage said jaw clutch teeth on said shifter to form therewith a jaw clutch adapted to transmit torque from said driving means to said clutch member, said clutch hub and said shifter being mounted on said splined shaft to transmit torque together from said splined shaft to said clutch member and said jaw clutch teeth on said shifter and on said clutch member being so spaced that when said friction clutch is transmitting coast load to said splined shaft the coast load sides of said teeth are out of driving engagement, means for shifting said shifter and said friction clutch parts to first engage said friction clutch parts and thereafter engage said jaw clutch or to disengage said jaw clutch and thereafter disengage said friction clutch, and spring means adapted to yieldingly hold said shifter in engagement with driving portions of the splines of said splined shaft.

4. The combination of a prime mover, a driven member, and a clutch interposed therebetween, comprising a splined shaft having a shifter splined thereto for longitudinal movement and having rotational play thereon, a friction clutch hub splined thereon and having rotational play thereon, jaw clutch teeth on said shifter, and a friction clutch plate on said friction clutch hub, a clutch member having thereon friction clutch parts adapted to cooperate with said friction clutch plate to form a friction clutch therewith to transmit torque and coast load, said friction clutch plate and said clutch parts being of a size to carry the coast load but insufficient to carry driving torque load in excess of the coast load, jaw clutch teeth adapted to engage said jaw clutch teeth on said shifter to form therewith a jaw clutch adapted to transmit torque from said driving means to said clutch member, said clutch hub and said shifter being mounted on said splined shaft to transmit torque together from said splined shaft to said clutch member and said jaw clutch teeth on said shifter and on said clutch member being so spaced that when said friction clutch is transmitting coast load to said splined shaft the coast load sides of said teeth are out of driving engagement, means for shifting said shifter and said friction clutch parts to first engage said friction clutch parts and thereafter engage said jaw or to disengage said jaw clutch and thereafter disengage said friction clutch, and spring means adapted to yieldingly hold said shifter in engagement with driving portions of the splines of said splined shaft.

5. The combination in the order named, of an engine, a hydraulic coupling, a transmission, and a clutch comprising a splined shaft having a shifter splined thereto for longitudinal movement, a friction clutch hub splined thereon, jaw clutch teeth on said shifter, and a friction clutch plate on said friction clutch hub, a clutch member having thereon friction clutch parts adapted to cooperate with said friction clutch plate to form a friction clutch therewith to transmit torque and coast load, said friction clutch plate and said clutch parts being of a size to carry the coast load but insufficient to carry driving torque load in excess of the coast load, jaw clutch teeth adapted to engage said jaw clutch teeth on said shifter to form therewith a jaw clutch adapted to transmit torque from said driving means to said clutch member, and synchronizing teeth on said clutch hub and on said shifter adapted to block said jaw clutch teeth until they are brought into synchronization after engagement of said friction clutch, said clutch hub and said shifter being mounted on said splined shaft to transmit torque together from said splined shaft to said clutch member and said jaw clutch teeth on said shifter and on said clutch member being so spaced that when said friction clutch is transmitting coast load to said splined shaft the coast load sides of said teeth are out of driving engagement, and means for shifting said shifter and said friction clutch parts to first engage said friction clutch parts and thereafter engage said jaw clutch only after synchronization or to disengage said jaw clutch and thereafter disengage said friction clutch.

6. The combination in the order named, of an engine, a hydraulic coupling, a transmission, and a clutch comprising a splined shaft having a shifter splined thereto for longitudinal movement and having rotational play thereon, a friction clutch hub splined thereon and having rotational play thereon, jaw clutch teeth on said shifter, and a friction clutch plate on said friction clutch hub, a clutch member having thereon friction clutch parts adapted to cooperate with said friction clutch plate to form a friction clutch therewith to transmit torque and coast load, said friction clutch plate and said clutch parts being of a size to carry the coast load but insufficient to carry driving torque load in excess of the coast load, jaw clutch teeth adapted to engage said jaw clutch teeth on said shifter to form therewith a jaw clutch adapted to transmit torque from said driving means to said clutch member, said clutch hub and said shifter being mounted on said splined shaft to transmit torque together from said splined shaft to said clutch member and said jaw clutch teeth on said shifter and on said clutch member being so spaced that when said friction clutch is transmitting coast load to said splined shaft the coast load sides of said teeth are out of driving engagement, and means for shifting said shifter and said friction clutch parts to first engage said friction clutch parts and thereafter engage said jaw clutch or to disengage said jaw clutch and thereafter disengage said friction clutch.

7. The combination of a prime mover, a driven member, and a clutch interposed therebetween, comprising a splined shaft having a shifter splined thereto for longitudinal movement and having rotational play thereon, a friction clutch hub splined thereon, jaw clutch teeth on said shifter, and a friction clutch plate on said friction clutch hub, a clutch member having thereon friction clutch parts adapted to cooperate with said friction clutch plate to form a friction clutch therewith to transmit torque and coast load, said friction clutch plate and said clutch parts being of a size to carry the coast load but insufficient to carry driving torque load in excess of the coast load, jaw clutch teeth adapted to engage said jaw clutch teeth on said shifter to form therewith a jaw clutch adapted to transmit torque from said driving means to said clutch member, said clutch hub and said shifter being mounted on said splined shaft to transmit torque together from said splined shaft to said clutch member and said jaw clutch teeth on said shifter and on said clutch member being so spaced that when said friction clutch is transmitting coast load to said splined shaft the coast load sides of said teeth are out of driving engagement, and means for shifting said shifter and said friction clutch parts to first engage said friction clutch parts and thereafter engage said jaw clutch or to disengage said jaw clutch and thereafter disengage said friction clutch.

8. The combination in the order named, of an engine, a hydraulic coupling, a transmission, and a clutch comprising driving means connected to the output shaft of said transmission and having a shifter splined thereto for longitudinal movement and having a friction clutch hub mounted thereon to transmit torque from or coast load to said driving means and having rotational play thereon, jaw clutch teeth on said shifter, and a friction clutch plate on said friction clutch hub, a clutch member having thereon friction clutch parts adapted to cooperate with said friction clutch plate to form a friction clutch therewith to transmit torque and coast load, said friction clutch plate and said clutch parts being of a size to carry the coast load but insufficient to carry driving torque load in excess of the coast load, and jaw clutch teeth adapted to engage said jaw clutch teeth on said shifter to form therewith a jaw clutch adapted to transmit torque from said driving means to said clutch member but not adapted to transmit coast load to said driving means when said friction clutch is transmitting coast load, means for shifting said shifter to disengage said jaw clutch teeth and thereafter to actuate said friction clutch parts to disengage said friction clutch or to actuate said friction clutch parts to first engage said friction clutch and then shift said shifter to engage said jaw clutch, and synchronizing teeth on said clutch hub and on said shifter adapted to block said jaw clutch teeth until they are brought into synchronization after engagement of said friction clutch.

9. The combination in the order named, of an engine, a hydraulic coupling, a transmission, and a clutch comprising driving means connected to the output shaft of said transmission and having a shifter splined thereto for longitudinal movement and having a friction clutch hub mounted thereon to transmit torque from or coast load to said driving means, jaw clutch teeth on said shifter, and a friction clutch plate on said friction clutch hub, a clutch member having thereon friction clutch parts adapted to cooperate with said friction clutch plate to form a friction clutch therewith to transmit torque and coast load, said friction clutch plate and said clutch parts being of a size to carry the coast load but insufficient to carry driving torque load in excess of the coast load, and jaw clutch teeth adapted to engage said jaw clutch teeth on said shifter to form therewith a jaw clutch adapted to transmit torque from said driving means to said clutch member but not adapted to transmit coast load to said driving means when said friction clutch is transmitting coast load, and means for shifting said shifter to disengage said jaw clutch teeth and thereafter to actuate said friction clutch parts to disengage said friction clutch or to actuate said friction clutch parts to first engage said friction clutch and then shift said shifter to engage said jaw clutch.

10. The combination of a prime mover, a driven member, and a clutch interposed therebetween, comprising driving means having a shifter splined thereto for longitudinal movement and having a friction clutch hub mounted thereon to transmit torque from or coast load to said driving means and having rotational play thereon, jaw clutch teeth on said shifter, and a friction clutch plate on said friction clutch hub, a clutch member having thereon friction clutch parts adapted to cooperate with said friction clutch plate to form a friction clutch therewith to transmit torque and coast load, said friction clutch plate and said clutch parts being of a size to carry the coast load but insufficient to carry driving torque load in excess of coast load, jaw clutch teeth adapted to engage said jaw clutch teeth on said shifter to form therewith a jaw clutch adapted to transmit torque from said driving means to said clutch member but not adapted to transmit coast load to said driving means when said friction clutch is transmitting coast load, means for shifting said shifter to disengage said jaw clutch teeth and thereafter to actuate said friction clutch parts to disengage said friction clutch or to actuate said friction clutch parts to first engage said friction clutch and then shift said shifter to engage said jaw clutch, and synchronizing teeth on said clutch hub and on said shifter adapted to block said jaw clutch teeth until they are brought into synchronization after engagement of said friction clutch.

11. The combination of a prime mover, a driven member, and a clutch interposed therebetween, comprising driving means having a shifter splined thereto for longitudinal movement and having a friction clutch hub mounted thereon to transmit torque from or coast load to said driving means, jaw clutch teeth on said shifter and a friction clutch plate on said friction clutch hub, a clutch member having thereon friction clutch parts adapted to cooperate with said friction clutch plate to form a friction clutch therewith to transmit torque and coast load, said friction clutch plate and said clutch parts being of a size to carry the coast load but insufficient to carry driving torque load in excess of the coast load, and jaw clutch teeth adapted to engage said jaw clutch teeth on said shifter to form therewith a jaw clutch adapted to transmit torque from said driving means to said clutch member but not adapted to transmit coast load to said driving means when said friction clutch is transmitting coast load, and means for shifting said shifter to disengage said jaw clutch teeth and thereafter to actuate said friction clutch parts to disengage said friction clutch or to actuate said friction clutch parts to first engage said friction clutch and then shift said shifter to engage said jaw clutch.

12. The combination of a prime mover, a driven member, and a clutch interposed therebetween, comprising driving means having a shifter splined thereto for longitudinal movement and having a friction clutch hub mounted thereon to transmit torque from or coast load to said driving means and having rotational play thereon, jaw clutch teeth on said shifter, and a friction clutch plate on said friction clutch hub, a clutch member having thereon friction clutch parts adapted to cooperate with said friction clutch plate to form a friction clutch therewith to transmit torque and coast load, and jaw clutch teeth adapted to engage said jaw clutch teeth on said shifter to form therewith a jaw clutch adapted to transmit torque from said driving means to said clutch member but not adapted to transmit coast load to said driving means when said friction clutch is transmitting coast load, and means for shifting said shifter to disengage said jaw clutch teeth and thereafter to actuate said friction clutch parts to disengage said friction clutch or to actuate said friction clutch parts to first engage said friction clutch and then shift said shifter to engage said jaw clutch, and synchronizing teeth on said clutch hub and on said shifter adapted to block said jaw clutch teeth until they are brought into synchronization after engagement of said friction clutch.

13. The combination of a prime mover, a driven member, and a clutch interposed therebetween, comprising driving means having a shifter splined thereto for longitudinal movement and having a friction clutch hub mounted thereon to transmit torque from or coast load to said driving means, jaw clutch teeth on said shifter and a friction clutch plate on said friction clutch hub, a clutch member having thereon friction clutch parts adapted to cooperate with said friction clutch plate to form a friction clutch therewith to transmit torque and coast load, and jaw clutch teeth adapted to engage said jaw clutch teeth on said shifter to form therewith a jaw clutch adapted to transmit torque from said driving means to said clutch member but not adapted to transmit coast load to said driving means when said friction clutch is transmittting coast load, and means for shifting said shifter to disengage said jaw clutch teeth and thereafter to actuate said friction clutch parts to disengage said friction clutch or to actuate said friction clutch parts to first engage said friction clutch and then shift said shifter to engage said jaw clutch.

14. The combination of a prime mover, a driven member, and a clutch therebetween, comprising a splined shaft having a shifter splined thereon for longitudinal movement and a clutch hub splined thereon with a loosely fitted splined connection providing backlash, said shifter having clutch teeth thereon and said hub having a friction clutch plate thereon, said shifter and hub being splined to said shaft to permit them to be driven together by said splined shaft to transmit torque, a clutch member having clutch teeth thereon adapted to engage the clutch teeth on said shifter, and friction clutch parts to engage the friction clutch plate, said clutch teeth having sufficient backlash to prevent their engagement during coasting prior to the taking up of backlash between said clutch hub and said splined shaft whereby said friction clutch plate and clutch parts carry all coast load and relieves said clutch teeth thereof to permit easy disengagement of said teeth during coasting, and means to disengage said clutch means by first shifting said shifter to disengage said teeth and thereafter to disengage said friction clutch parts from said clutch plate and to engage said clutch means by first engaging said friction clutch parts with said plate and then engaging said teeth, and synchronizing teeth on said clutch hub and on said shifter for synchronizing said clutch teeth before their engagement and after engagement of said friction clutch parts with said plate.

15. The combination of a prime mover, a driven member, and a clutch therebetween, comprising a splined shaft having a shifter splined thereon for longitudinal movement, and a clutch hub splined thereon with a loosely fitted splined connection providing backlash, said shifter having clutch teeth thereon and said hub having a friction clutch plate thereon, said shifter and hub being splined to said shaft to permit them to be driven together by said splined shaft to transmit torque, a clutch member having clutch teeth thereon adapted to engage the clutch teeth on said shifter, and friction clutch parts to engage the friction clutch plate, said clutch teeth having sufficient backlash to prevent their engagement during coasting prior to the taking up of blacklash between said clutch hub and said splined shaft whereby said friction clutch plate and clutch parts carry all coast load and relieve said clutch teeth thereof to permit easy disengagement of said teeth during coasting, and means to disengage said clutch means by first shifting said shifter to disengage said teeth and thereafter to disengage said friction clutch parts from said clutch plate and to engage said clutch means by first engaging said friction clutch parts with said plate and then engaging said teeth.

16. The combination of a prime mover, a driven member, and a clutch therebetween, comprising a splined shaft having a shifter splined thereon for longitudinal movement, and a clutch hub splined thereon with a loosely fitted splined connection providing backlash, said shifter having clutch teeth thereon and said hub having a friction clutch plate thereon, said shifter and hub being splined to said shaft to permit them to be driven together by said splined shaft to transmit torque, a clutch member having clutch teeth thereon adapted to engage the clutch teeth on said shifter, and friction clutch parts to engage the friction clutch plate, said clutch teeth having sufficient backlash to prevent their engagement during coasting prior to the taking up of backlash between said clutch hub and said splined shaft whereby said friction clutch plate and clutch parts carry all coast load and relieve said clutch teeth thereof to permit easy disengagement of said teeth during coasting.

17. The combination in the order named, of an engine, a hydraulic coupling, a transmission, and a clutch comprising a splined shaft having a shifter splined thereto for longitudinal movement and having rotational play thereon, a friction clutch hub splined thereon and having rotational play thereon, jaw clutch teeth on said shifter and a friction clutch plate on said friction clutch hub, a clutch member having thereon friction clutch parts adapted to cooperate with said friction clutch plate to form a friction clutch therewith to transmit torque and coast load, jaw clutch teeth adapted to engage said jaw clutch teeth on said shifter to form therewith a jaw clutch adapted to transmit torque from said driving means to said clutch member, and synchronizing teeth on said clutch hub and on said shifter adapted to block said jaw clutch teeth until they are brought into synchronization after engagement of said friction clutch, said clutch hub and said shifter being mounted on said splined shaft to transmit torque together from said splined shaft to said clutch member and said jaw clutch teeth on said shifter and on said clutch member being so spaced that when said friction clutch is transmitting coast load to said splined shaft the coast load sides of said teeth are out of driving engagement, and means for shifting said shifter and said friction clutch parts to first engage said friction clutch parts and thereafter engage said jaw clutch only after synchronization or to disengage said jaw clutch and thereafter disengage said friction clutch.

18. The combination of a prime mover, a driven member, and a clutch interposed therebetween, comprising a splined shaft having a shifter splined thereto for longitudinal movement and having rotational play thereon, a friction clutch hub splined thereon and having rotational play thereon, jaw clutch teeth on said shifter and a friction clutch plate on said friction clutch hub, a clutch member having thereon friction clutch parts adapted to cooperate with said friction clutch plate to form a friction clutch therewith to transmit torque and coast load, jaw clutch teeth adapted to engage said jaw clutch teeth on said shifter to form therewith a jaw clutch adapted to transmit torque from said driving means to said clutch member, said clutch hub and said shifter being mounted on said splined shaft to transmit torque together from said splined shaft to said clutch member and said jaw clutch teeth on said shifter and on said clutch member being so spaced that when said friction clutch is transmitting coast load to said splined shaft the coast load sides of said teeth are out of driving engagement, and means for shifting said shifter and said friction clutch parts to first engage said friction clutch parts and thereafter engage said jaw clutch or to disengage said jaw clutch and thereafter disengage said friction clutch.

19. The combination in a motor vehicle, of a prime mover, a hydraulic coupling, a transmission, a clutch mechanism, and a driven member associated in the order named, the driven member being subject to coasting load of the vehicle, said clutch mechanism comprising a friction clutch and a positive clutch, said friction clutch being operatively connected to the transmission to transmit coasting load thereto and being operatively associated with said positive clutch to relieve said positive clutch of coasting load and to permit easy disengagement of said positive clutch during coasting, said friction clutch being also associated with said positive clutch to synchronize the elements of said positive clutch for engagement, said friction clutch having sufficient capacity to carry the coacting load but being of insufficient capacity to carry all the torque developed by the prime mover through said transmission, said hydraulic coupling permitting engagement of the clutch without stalling the prime mover.

20. The combination in a motor vehicle, of a prime mover, a transmission, a clutch mechanism, and a driven member associated in the order named, the driven member being subject to coasting load of the vehicle, said clutch mechanism comprising a friction clutch and a positive clutch, said friction clutch being operatively connected to the transmission to transmit coasting load thereto and being operatively associated with said positive clutch to relieve said positive clutch of coasting load and to permit easy disengagement of said positive clutch during coasting, said friction clutch being also associated with said positive clutch to synchronize the elements of said positive clutch for engagement, said friction clutch having sufficient capacity to carry the coacting load but being of insufficient capacity to carry all the torque developed by the prime mover through said transmission.

21. The combination in a motor vehicle, of a prime mover, a hydraulic coupling, a transmission, a clutch mechanism, and a driven member associated in the order named, the driven member being subject to coasting load of the vehicle, said clutch mechanism comprising a friction clutch and a positive clutch, said friction clutch being operatively connected to the transmission to transmit coast load thereto and being operatively associated with said positive clutch to relieve said positive clutch of coast load, said friction clutch being of sufficient capacity to carry the coast load but of insufficient capacity to carry the torque developed by the prime mover through said transmission exceeding the coast load, said hydraulic coupling permitting engagement of the clutch without stalling the prime mover.

22. The combination in a motor vehicle, of a prime mover, a transmission, a clutch mechanism, and a driven member associated in the order named, the driven member being subject to coasting load of the vehicle, said clutch mechanism comprising a friction clutch and a positive clutch, said friction clutch being operatively connected to the transmission to transmit coast load thereto and being operatively associated with said positive clutch to relieve said positive clutch of coast load, said friction clutch being of sufficient capacity to carry the coast load but of insufficient capacity to carry the torque developed by the prime mover through said transmission exceeding the coast load.

THOMAS BACKUS.